(12) United States Patent
Bonny

(10) Patent No.: US 11,679,753 B1
(45) Date of Patent: *Jun. 20, 2023

(54) REGENERATION POWER CONTROL

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 77 days.

This patent is subject to a terminal disclaimer.

(21) Appl. No.: 17/327,167

(22) Filed: May 21, 2021

Related U.S. Application Data

(63) Continuation of application No. 16/117,820, filed on Aug. 30, 2018, now Pat. No. 11,014,549, which is a continuation-in-part of application No. 15/398,423, filed on Jan. 4, 2017, now Pat. No. 10,183,662.

(Continued)

(51) Int. Cl.
*B60W 20/14* (2016.01)
*B60K 6/20* (2007.10)
(Continued)

(52) U.S. Cl.
CPC .............. *B60W 20/14* (2016.01); *B60K 6/20* (2013.01); *B60W 10/08* (2013.01); *B60W 10/30* (2013.01);
(Continued)

(58) Field of Classification Search
CPC ...... B60W 20/14; B60W 10/08; B60W 10/30; B60W 2510/305; B60W 2552/15;
(Continued)

(56) References Cited

U.S. PATENT DOCUMENTS 6,333,620 B1 12/2001 Schmitz et al.
6,462,506 B2 10/2002 Cochoy et al.
(Continued)

FOREIGN PATENT DOCUMENTS

JP 2015030427 2/2015

OTHER PUBLICATIONS

Lin, et al., "Control System Development for an Advanced-Technology Medium-Duty Hybrid Electric Truck," SAE International, 2003.

*Primary Examiner* — Rami Khatib
(74) *Attorney, Agent, or Firm* — Neal, Gerber & Eisenberg LLP

(57) ABSTRACT

A utility vehicle with regenerative braking is disclosed. The utility vehicle includes a power bus, a battery coupled to the system power bus, and at least one electric drive motor to generate power through regenerative braking and supply the generated power onto the power bus. The utility vehicle includes a power regulation controller configured to direct the generated power to the battery to recharge the battery when the battery is not fully charged, direct the generated power to at least one power sink to consume the generated power when the battery is fully charged and the generated power is less than or equal to a power consumption limit, and reduce a maximum travel speed to reduce an amount of power generated by the at least one electric drive motor through regenerative braking when the battery is fully charged and the generated power is greater than the power consumption limit.

20 Claims, 4 Drawing Sheets

Related U.S. Application Data

(60) Provisional application No. 62/274,608, filed on Jan. 4, 2016.

(51) Int. Cl.
   *B60W 10/30* (2006.01)
   *B60W 10/08* (2006.01)

(52) U.S. Cl.
   CPC ... *B60W 2510/305* (2013.01); *B60W 2552/15* (2020.02); *B60W 2710/08* (2013.01); *B60W 2710/30* (2013.01); *B60Y 2200/92* (2013.01); *B60Y 2300/18125* (2013.01); *B60Y 2300/91* (2013.01); *B60Y 2400/87* (2013.01)

(58) Field of Classification Search
   CPC . B60W 2710/08; B60W 2710/30; B60K 6/20; B60Y 2200/92; B60Y 2300/18125; B60Y 2300/91; B60Y 2400/87
   See application file for complete search history.

(56) References Cited

U.S. PATENT DOCUMENTS

| | | |
|---|---|---|
| 6,591,593 B1 | 7/2003 | Brandon et al. |
| 6,986,727 B2 | 1/2006 | Kuras et al. |
| 7,131,708 B2 | 11/2006 | Tao et al. |
| 7,379,797 B2 | 5/2008 | Nasr et al. |
| 7,460,941 B2 | 12/2008 | Sychra et al. |
| 7,482,767 B2 | 1/2009 | Tether |
| 7,735,592 B2 | 6/2010 | Bellot et al. |
| 9,113,596 B2 | 8/2015 | Bricko et al. |
| 9,566,976 B2 | 2/2017 | Fujishiro et al. |
| 9,764,734 B1 | 9/2017 | Brown |
| 2013/0015791 A1 | 1/2013 | Hatsumi et al. |
| 2014/0097676 A1 | 4/2014 | Kusumi |
| 2014/0358340 A1* | 12/2014 | Radev ............... B60W 10/26 180/65.265 |
| 2015/0134206 A1 | 5/2015 | Matsunaga et al. |
| 2015/0174998 A1 | 6/2015 | Okada et al. |

* cited by examiner

REGENERATION POWER CONTROL

CROSS REFERENCE

This application is a continuation of U.S. application Ser. No. 16/117,820, filed on Aug. 30, 2018, which is a continuation-in-part of U.S. application Ser. No. 15/398,423, filed on Jan. 4, 2017, now U.S. Pat. No. 10,183,662 which claims the benefit of U.S. Provisional Patent Application No. 62/274,608, filed on Jan. 4, 2016. These prior applications are incorporated by reference herein in their entireties.

BACKGROUND

The disclosure herein relates power regeneration with regard to hybrid vehicles and in particular lawn and garden mowers and similar vehicles.

SUMMARY

It is known to use a hybrid drive system including an internal combustion engine driving a generator to power ground drive motors to power the output wheels of a mower, tractor or similar lawn and garden vehicle. Such a vehicle may also include cutting blades or another output such as an auger, and such blades or other output may be powered directly by the internal combustion engine or by separate electric drive motors. When such a vehicle is going down a slope (or grade), excess electricity can be created. The present disclosure presents systems and methods for reducing or handling such excess electricity.

A better understanding of the disclosure will be obtained from the following detailed descriptions and accompanying drawings, which set forth illustrative embodiments that are indicative of the various ways in which the principals of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

Figure 1:
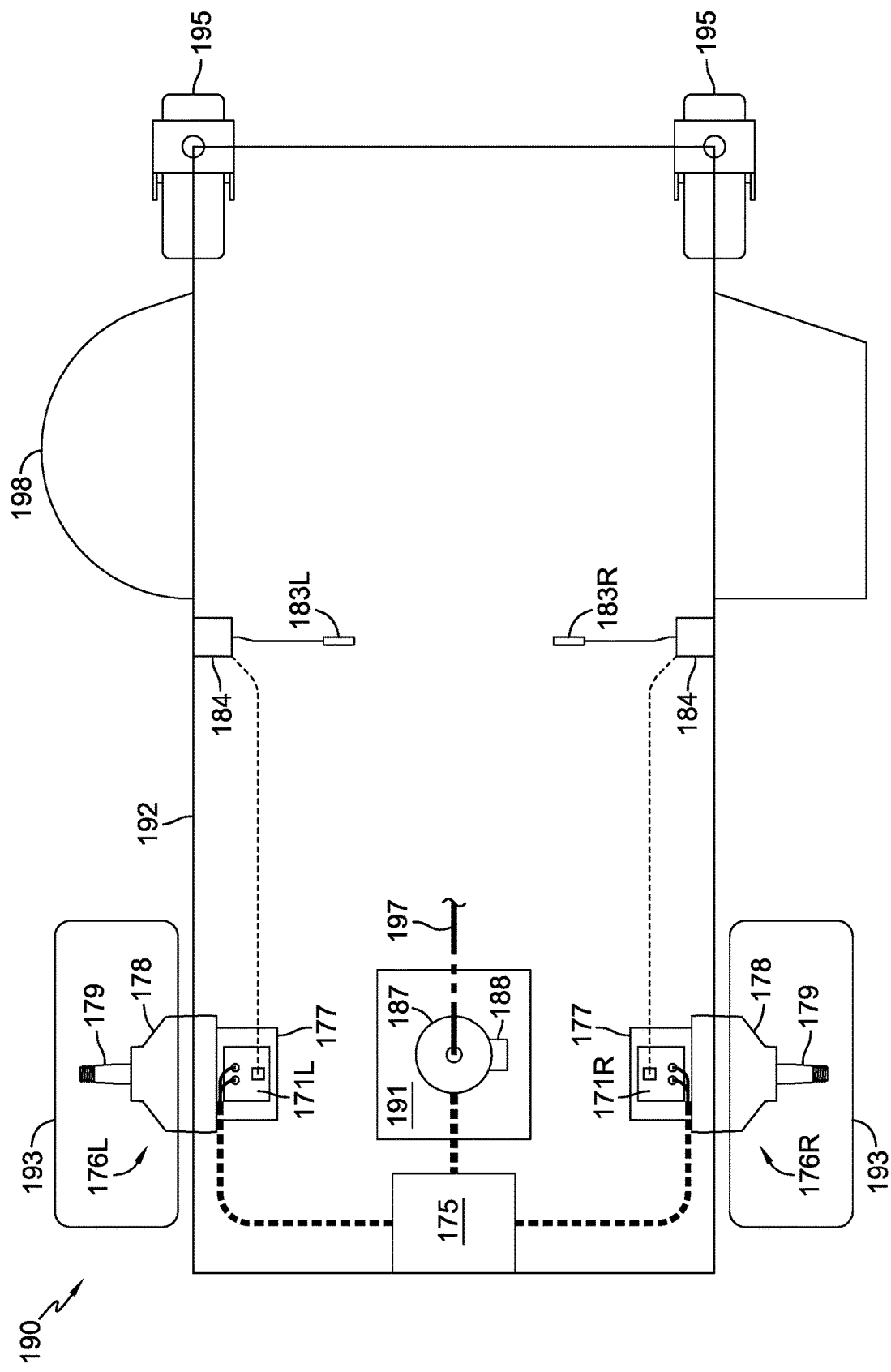
FIG. 1 is a schematic representation of an exemplary hybrid vehicle in accordance with the teachings herein.

The control systems disclosed herein may be used in vehicles such as zero turn lawn and garden tractors, and an exemplary hybrid vehicle 190 is depicted in FIG. 1. Vehicle frame 192 supports an optional mowing deck 198 and a pair of front casters 195, along with battery 175 and internal combustion engine 191. Engine 191 drives a generator 187 and a standard belt and pulley system 197. A generator controller 188 controls the operation of the generator 187. A pair of electric transaxles 176L, 176R, each having an electric motor 177, is disposed on opposite sides of vehicle frame 192 and each electric motor 177 drives a gear reduction 178 and an output axle 179 to power a driven wheel 193.

A first integral motor controller 171L is operatively connected to electric transaxle 176L and powered by battery 175. A second integral motor controller 171R is operatively connected to electric transaxle 176R and is also powered by battery 175. In the hybrid vehicle 190 depicted in FIG. 1, a pair of speed control mechanisms 184 is connected to respective control levers 183L, 183R. Motor controllers 171L, 171R may also be referred to as ground drive controllers.

In one embodiment, the hybrid vehicle 190 uses regenerative braking to limit the speed of the hybrid vehicle 190 when driving down a slope. When the hybrid vehicle 190 uses regenerative braking, the motors 177 act like generators and produce power on the system power bus instead of consuming power. To accomplish this regenerative braking function, motor controllers 171L, 171R may be configured to provide "Four Quadrant Motor Control" of the electric motors 177, as is known. For example, a motor 177 consumes power (1) in a first quadrant (Forward Motoring) of a four-quadrant motor control when both the torque and the rotational speed of the motor 177 are increasing (positive) or (2) in a third quadrant (Reverse Motoring) of the four-quadrant motor control when both the torque and the rotational speed of the motor 177 are decreasing (negative). Further, a motor 177 generates power via regenerative braking (1) in a second quadrant (Forward Braking) of the four-quadrant motor control when the torque of the motor 177 is decreasing (negative) and the rotational speed of the motor 177 is increasing (positive) or (2) in a fourth quadrant (Reverse Braking) of the four-quadrant motor control when the torque of the motor 177 is increasing (positive) and the rotational speed of the motor 177 is decreasing (negative). As used herein, the system power bus may include typical components such as the cables electrically coupling the generator 187 to the battery 175, cables electrically coupling the battery 175 to the integral motor controllers 171L and 171R and the like. The hybrid vehicle 190 (a) consumes the extra power produced by the motors 177 and/or (b) limits its downhill speed to reduce the power generated by motors 177. The integral motor controllers 171L and 171R of the hybrid vehicle 190 set a downhill maximum vehicle speed. The downhill maximum vehicle speed may be different than the maximum speed allowed when the hybrid vehicle 190 is driven on a relatively flat surface or up a slope.

A control algorithm involves using the information gathered in the ground drive controllers 171L and 171R (control stroke, reverse torque amps, etc.) to determine when the hybrid vehicle 190 is going down a slope. In one embodiment, the ground drive controllers 171L and 171R use current sensing on the motor phases and/or buses to determine when the vehicle 190 is going down a slope. For example, the ground drive controllers 171L and 171R may determine that the hybrid vehicle 190 is driving down a slope when the current demand to the ground drive motors 177 drops below a threshold. The control algorithm reacts to the steepness of the slope by reducing the maximum vehicle speed to programmed limits. This reduces the amount of power regenerated to the buses, thus also limiting the amount of power that the generator 187 needs to dissipate. In other embodiments, other methods of detecting when the vehicle 190 is going down a slope may be used, such as one or more gyro sensors or other angle sensors, which could be incorporated into the controllers 171L, 171R. It will be understood that a control system could be used with vehicle 190 to reduce the speed of the ground drive motors 177 based on the pitch values generated by the sensors. One such exemplary stability control system used with a hybrid vehicle is disclosed in commonly-owned U.S. pat. app. Ser. No. 15/082,425, now U.S. Pat. No. 9,764,734, the terms of which are incorporated by reference in their entirety.

The regenerated power from motors 177 is transferred onto the system power bus. The regenerated power will be used: (i) if needed, to power one of the motors 177 (for example, when one of the wheels 193 is to turn); (ii) to recharge battery 175; and/or (iii) to drive internal combustion engine 191. The capability to charge battery 175 is dependent on (a) the charge status of battery 175 (such as, full, 95% full, 90% full, etc.); (b) a regeneration charge rate from the system power bus (for example, the higher the regeneration charge rate, the faster the voltage will rise in battery 175); and/or (c) the temperature of battery 175.

Figure 2:
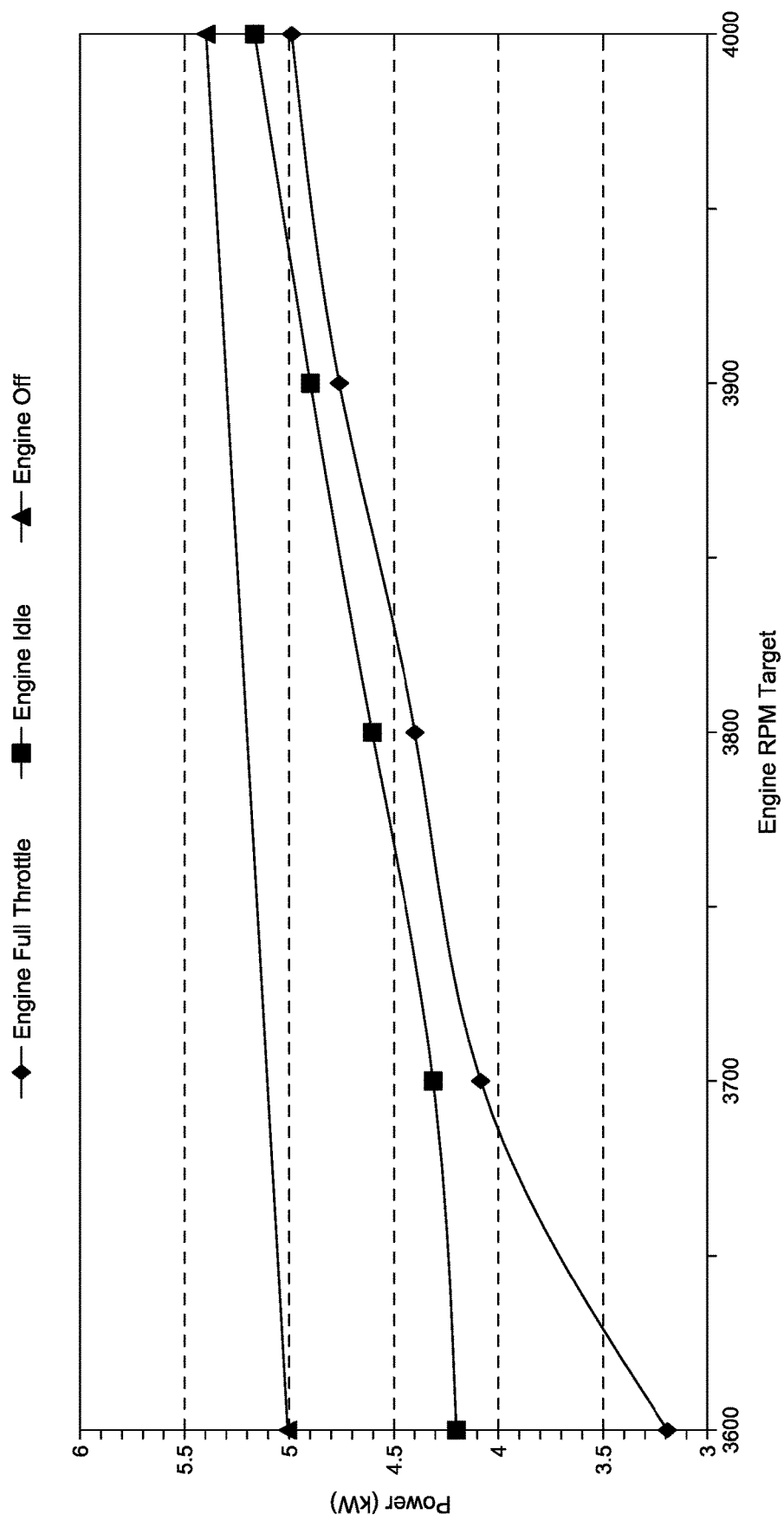
FIG. 2 is a chart that illustrates the power consumed by the engine of the hybrid vehicle of FIG. 1 when driven at different target speeds.

Normally, the internal combustion engine 191 drives the generator 187 via a driveshaft. The internal combustion engine 191 can be driven, or in some situations, overdriven by the generator 187 when there is extra power on the system power bus. The control algorithm enables the generator 187 to drive the internal combustion engine 191 at a speed (in revolutions per minute (RPM)) faster than the RPM of the set maximum engine speed for driving on a relatively flat surface. Thus, the generator 187 functions as an electric motor to overdrive the engine 191 at a specified speed above the engine speed limiter (or governor) setting for driving on a relatively flat surface. In this manner, the engine 191 consumes power (such as, 4 kW of power) produced by the electric motors 177 safely and provides margin to consume additional power if needed. FIG. 2 is a chart that illustrates the power consumed by the engine 191 at different target speeds when engine 191 is (a) at full throttle; (b) idle; and (c) off. As illustrated in FIG. 2, additional power is needed to spin the engine 191 if the engine 191 ignition function is shut off during overdrive mode. Ideally, when overdriving engine 191 and the engine maximum throttle set point is exceeded, fuel flow is shut off by the engine, followed by de-energizing of the ignition coil. Then, when the engine RPM decreases to a specified level, the ignition coil is re-energized, followed by resumption of fuel flow.

Hybrid vehicle 190 may also be configured to enable engine 191 and/or any power take off (PTO) devices to consume excess power from generator 187 or from motors 177 when engine 191 is shut off and while the vehicle is in a state of motion. For example, when hybrid vehicle 190 is moving down a slope, and when the battery is full, electric motors 177 may generate electricity that is routed by the control algorithm over the bus to the generator 187 to power the generator 187 and/or any PTO devices when a PTO system is engaged, such as cutting blades connected to a mower deck. Generator 187 may cause rotation of the output shaft of the de-energized engine 191 to drive the crank shaft, or provide power to PTO devices, to consume the excess power placed on the bus.

With the engine 191 shut off and when the hybrid vehicle 190 requires additional power because, for example, PTO devices require additional power (e.g., mower cutting blades are being driven through taller grass) or because the slope of the terrain provides, or is anticipated to provide, less vehicle kinetic energy to rotate electric motors 177 than what the control algorithm predicts or determines is needed, then the control algorithm may cause re-energizing of the engine ignition system followed by re-engaging fuel flow to the engine 191 to allow the engine 191 to restart via rotation of the output shaft of the engine 191 by the generator 187.

Based on the testing information represented in FIG. 2, the ground drive motor controllers 171L, 171R were reviewed to see what is needed to reduce the regenerated or braking energy to maintain a maximum total generation to match what the generator 187 will use (such as 4 kW). Following are equations used to balance the power in the system:

$$\text{Power } (P) = \text{Current } (I) \times \text{Voltage } (V) \qquad \text{Equation (1)}$$

$$\text{Voltage } (V) = \text{Speed } (S) / \text{motor constant } (Kv) \qquad \text{Equation (2)}$$

There are three individual components that comprise the system, namely the generator 187, the system power bus, and the drive motors 177. Since the generator 187 is the constraint in the system, generator 187 is designed such that the output voltage at maximum RPM is slightly less than the minimum allowed system power bus voltage. This allows the power to be managed in a boosting control and prevents uncontrolled current output. For example, a minimum system power bus voltage may be 42V and a maximum IC engine speed may be 3600 RPM. In such an example, the generator 187 is designed to produce 40V. Using the voltage speed equation (2) above, the motor constant Kv (RPM per volt) in this example is 90. In this example, since power consumption may be 4 kW, the generator line current may be 94.7 amps. Because there is efficiency loss incoming to the generator 187, the 4 kW can be divided by the generator efficiency of 90%. This 4 kW divided by 0.9 gives a system power bus input power capability of 4444 watts that can be consumed by driving the engine 191. In this example, with 4444 watts being consumed though the system power bus by the generator 187, and a maximum system power bus of 55V, the current being moved through the system power bus is 80.8 A (per Equation (1) above).

The power that is available to be delivered to the system power bus is divided between the two ground drive motors 177, assuming equal braking capability. As a result, each ground drive motor 177 can place 2222 watts onto the system power bus. Assuming a regeneration efficiency of 80% through the motor and controller, the ground drive motors 177 are calculated to be able to generate up to 2777 watts each (2222 watts/0.8). For example, if the system power bus is maintained by the generator 187 at 55V, the ground drive motors 177 are able to generate up to 50.5 A.

The ground drive motors 177 constantly experience speed and torque demand changes depending on terrain, for example. Associated with an electric motor such as ground drive motor 177 is a design curve of current (amps) versus output torque. This same curve applies to the regenerative braking function of an electric motor such as ground drive motor 177.

Figure 3:
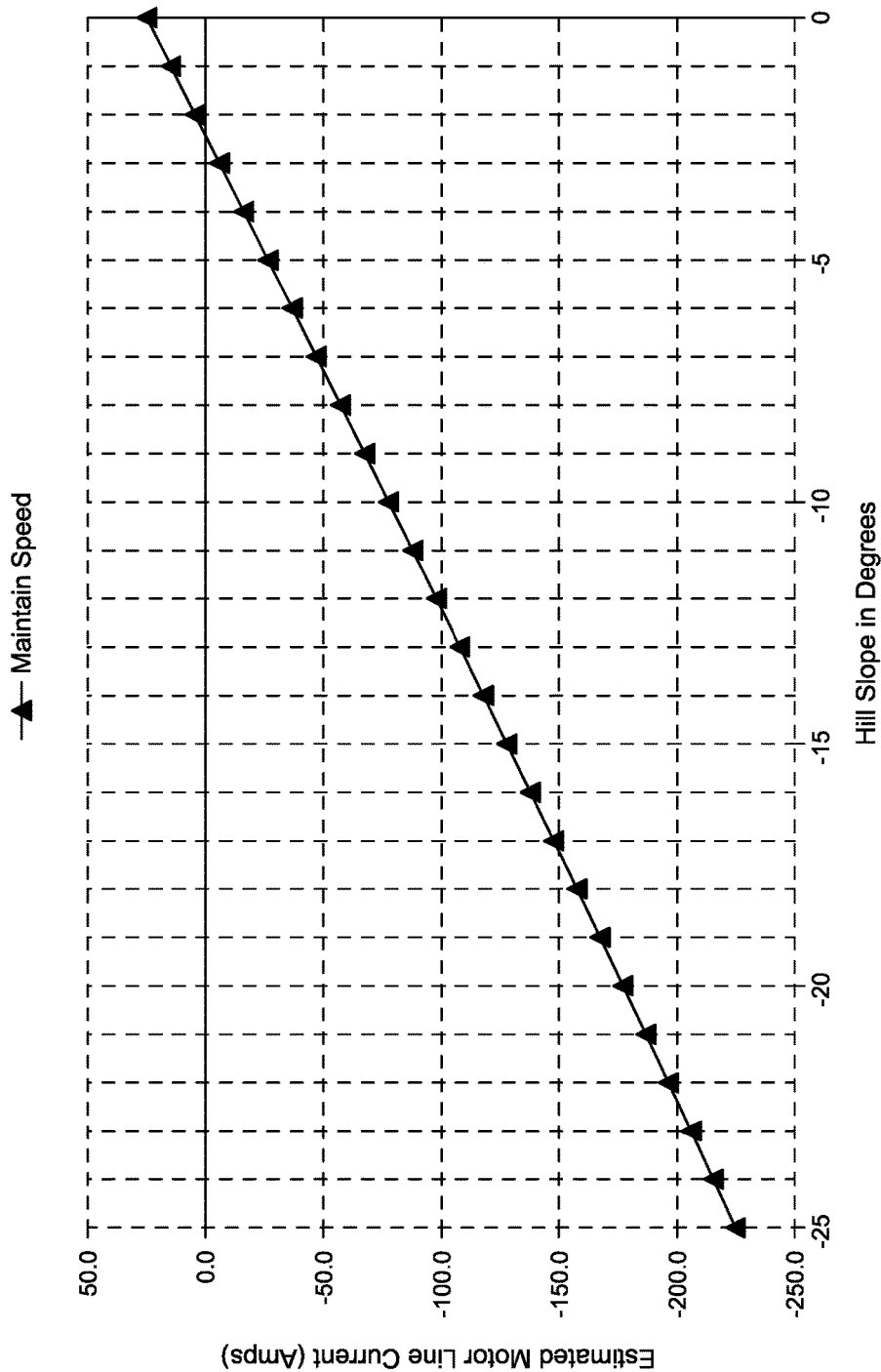
FIG. 3 illustrates an estimated motor line current for an exemplary two thousand pound hybrid vehicle on various slopes.

When the vehicle is driven downhill, there is a specific amount of torque resistance needed to maintain a vehicle's speed on the hill. As the hill slope continues to increase, the amount of torque resistance or current needed continues to increase. FIG. 3 illustrates estimated motor line current (in amps) for an exemplary two thousand pound hybrid vehicle 190 on various slopes (in degrees). For example, on a −8 degree slope, the estimated motor line current is −60 amps.

If the ground drive motor speed remains constant, the regeneration power and current both increase linearly as downhill slope increases linearly. When the ground drive regeneration power reaches its set maximum target, the ground drive speed is decreased and will continue to decrease with a further increase in downhill slope. The set maximum target is preferably just below the maximum amount of power that can be consumed through the generator 187 and the engine 191. Reducing the speed of the hybrid vehicle 190 reduces the voltage that the electric motors 177 output when using regenerative braking.

For example, when the battery 175 is full during regenerative braking, the battery 175 is unable to store power generated by the electric motors 177. In turn, to prevent excess power from being generated via regenerative braking, the power output of the electric motors 177 is reduced. In some examples, the power output generated by the electric motors 177 is reduced to equal the capacity of available (or utilized) power sinks, such as the engine 191 and/or a PTO system that is engaged, of the vehicle 190. Because the output power generated by the electric motors 177 corresponds with the speed of the vehicle 190, the maximum speed of the vehicle 190 is reduced to reduce the power output of the electric motors 177. In some examples, the maximum speed that prevents excess power from being generated via regenerative braking depends on whether a PTO system is engaged or disengaged. For example, if the PTO system is engaged, Equation (3), which is provided below, is utilized to calculate the maximum speed of the electric motors 177. Otherwise, if the PTO system is disengaged, Equation (4), which is provided below, is utilized to calculate the maximum speed of the electric motors 177.

$$S1 = \frac{MIN(Gp, Icp + Pcp)}{2} * \frac{Cp}{MAX(Tlm, Trm) + Trbs} \quad \text{Equation (3)}$$

$$S1 = \frac{MIN(Gp, Icp)}{2} * \frac{Cp}{MAX(Tlm, Trm) + Trbs} \quad \text{Equation (4)}$$

In the above-identified Equations (3) and (4), S1 represents the maximum speed limit of the vehicle 190 (e.g., in revolutions per minute (RPM)), Tlm represents a torque of a left electric motor 177 (e.g., in Newton-meters (Nm)), Trm represents a torque of a right electric motor 177 in (e.g., in Newton-meters), Icp represents consumable power of the engine 191 (e.g., in Watts (W)), Gp represents consumable power of the generator 187 (e.g., in Watts), Pcp represents consumable power of a PTO system (e.g., in Watts), Trbs represents a regenerative-braking safety-margin torque (e.g., in Newton-meters), and Cp represents a conversion factor for power (e.g., 9.5488 since 1 Nm*RPM=9.5488 W).

Figure 4:
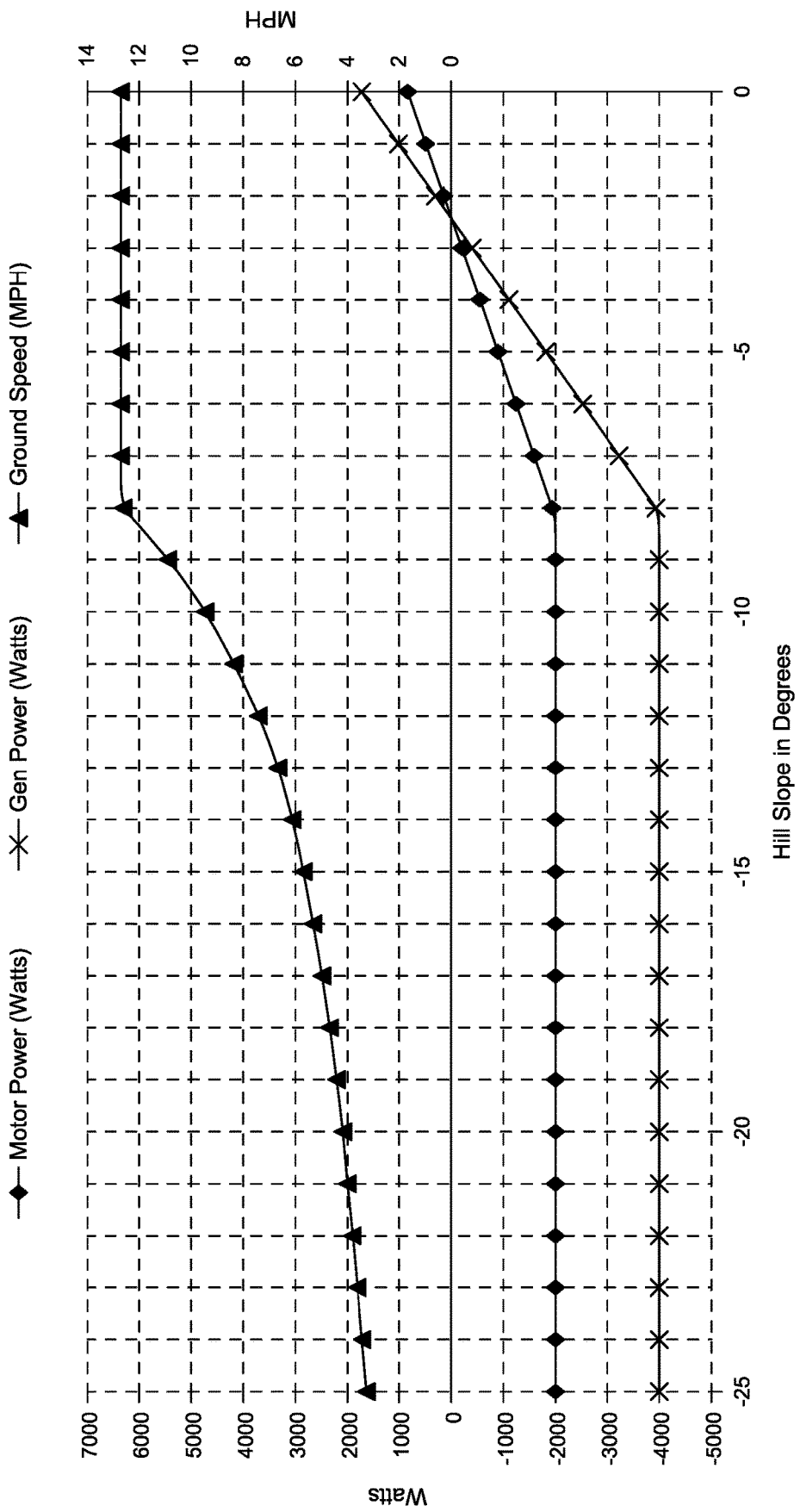
FIG. 4 is a chart with graphical representation of the vehicle maximum downhill speed decreasing to stabilize the regeneration power produced by the drive motors of the hybrid

FIG. 4 is a graphical representation of reducing the speed of vehicle 190 as the downhill slope increases in order to stabilize (at a set level) the regeneration power produced by the drive motors of the hybrid vehicle of FIG. 1. The exemplary vehicle for the graph in FIG. 4 has a gross vehicle weight of 2,000 pounds, and has its PTO system disengaged. This graph assumes use of a 55V bus and a 43V generator. Negative power represents the ground drive motor 177 operating as a generator and negative power for the generator 187 represents the generator 187 operating as a motor. In the example illustrated in FIG. 4, as the slope becomes steeper, generator 187 switches from generating power to consuming power (by driving the driveshaft of engine 191 when vehicle 190 is traveling on a slope of about −2.5 degrees). In the example illustrated in FIG. 4, at a slope of −8 degrees, generator 187 is consuming the set maximum target regeneration energy to drive the engine 191 at the target overdrive speed. In the example illustrated in FIG. 4, the integral motor controllers 171L and 171R reduce the maximum downhill speed of the hybrid vehicle 190. For example, at a slope of −14.5 degrees, the integral motor controllers 171L and 171R set the maximum downhill speed to 6 MPH.

The generator controller 188 has a reactive logic program. When the system power bus voltage begins to increase over the target system power bus voltage (such as 54V), the generator 187 will reduce its power output to try to keep the system power bus voltage below the target system power bus voltage. As the system power bus voltage continues to rise, the generator 187 eventually stops outputting power to the system power bus. If the system power bus voltage continues to rise, the generator 187 acts as a motor and begins to drive the engine 191. The generator 187 continues to increase the engine speed to the target overdrive speed set point or until the system power bus voltage reaches a voltage set point (such as 55V). The generator 187 remains in energy consumption mode until the power system bus voltage begins to drop to the target bus voltage at which point the generator would switch back to power generating.

The motor controllers 171L and 171R can be programmed based on two response methods, namely reactive versus predictive/preventative. The reactive method is a voltage reaction program that will reduce the vehicle speed as the bus voltage rises. The reactive control scheme may cause the vehicle to go into fast braking conditions that could create operator concern and controllability issues. The vehicle response to a hill descent may also change based on the battery state. This would create a potentially unpredictable vehicle response each time the operator traverses a hill.

The alternative predictive/preventative method is to limit the speed of the ground drive motor as the regeneration current increases. As the hill slope increases, the vehicle will slow to the "safe" balanced power state. The vehicle response would be consistent every time, thus allowing the operator to be comfortable with vehicle performance. While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A utility vehicle with regenerative braking, comprising:
   a system power bus;
   a battery coupled to the system power bus;
   at least one electric drive motor that is configured to generate power through regenerative braking and supply the generated power onto the system power bus; and
   a first controller configured to:
      when the battery is not fully charged, direct the generated power to the battery to recharge the battery;
      when the battery is fully charged and the generated power is less than or equal to a power consumption limit, direct the generated power to at least one power sink to consume the generated power; and when the battery is fully charged and the generated power is greater than the power consumption limit, reduce a maximum travel speed to reduce an amount of power generated by the at least one electric drive motor through regenerative braking.

2. The utility vehicle of claim 1, further including at least one ground drive controller that is configured to control the at least one electric drive motor.

3. The utility vehicle of claim 2, wherein the at least one ground drive controller is configured to determine a slope of a travel surface.

4. The utility vehicle of claim 3, wherein the first controller is configured to decrease the maximum travel speed in response to the at least one ground drive controller detecting an increase in the slope of the travel surface.

5. The utility vehicle of claim 3, wherein, to determine the slope of the travel surface, the at least one ground drive controller uses current sensing on at least one of the system power bus and phases of the at least one electric drive motor.

6. The utility vehicle of claim 3, further including at least one of a gyro sensor and an angle sensor to enable the at least one ground drive controller to determine the slope of the travel surface.

7. The utility vehicle of claim 1, further including a power take-off, wherein the at least one power sink includes the power take off when the power take off is engaged.

8. The utility vehicle of claim 1, wherein the first controller is configured to determine the maximum travel speed based on a torque of the at least one electric drive motor.

9. The utility vehicle of claim 8, wherein the first controller is configured to determine the maximum travel speed further based on consumable power of a power take-off that is engaged.

10. The utility vehicle of claim 1, wherein the at least one electric drive motor is configured to generate power through regenerative braking when a torque of the at least one electric drive motor is increasing and a rotational speed of the at least one electric drive motor is decreasing.

11. The utility vehicle of claim 1, wherein the at least one electric drive motor is configured to generate power through regenerative braking when a torque of the at least one electric drive motor is decreasing and a rotational speed of the at least one electric drive motor is increasing.

12. A regenerative braking system for a vehicle, comprising:
   a battery;
   at least one electric drive motor that is configured to generate power through regenerative braking; and
   a first controller configured to:
      when the battery is not fully charged, direct the generated power to recharge the battery;
      when the battery is fully charged and the generated power is less than or equal to a power consumption limit, direct the generated power to a vehicle power sink for consumption; and
      when the battery is fully charged and the generated power is greater than the power consumption limit, reduce a maximum travel speed of the vehicle to reduce an amount of power generated by the at least one electric drive motor through regenerative braking; and
   at least one ground drive controller configured to control the at least one electric drive motor.

13. The regenerative braking system of claim 12, wherein the at least one ground drive controller is configured to determine a slope of a travel surface.

14. The regenerative braking system of claim 13, wherein the first controller is configured to decrease the maximum travel speed in response to the at least one ground drive controller detecting an increase in the slope of the travel surface.

15. The regenerative braking system of claim 13, wherein the at least one ground drive controller uses current sensing to determine the slope of the travel surface.

16. The regenerative braking system of claim 13, wherein the at least one ground drive controller to determine the slope of the travel surface based on data collected by at least one of a gyro sensor and an angle sensor.

17. The regenerative braking system of claim 12, wherein the vehicle power sink is a power take-off when the power take off is engaged.

18. The regenerative braking system of claim 12, wherein the first controller is configured to determine the maximum travel speed based on a torque of the at least one electric drive motor.

19. The regenerative braking system of claim 18, wherein the first controller is configured to determine the maximum travel speed further based on consumable power of a power take-off that is engaged.

20. The regenerative braking system of claim 12, wherein the at least one electric drive motor is configured to generate power through regenerative braking when:
   a torque of the at least one electric drive motor is increasing and a rotational speed of the at least one electric drive motor is decreasing; or
   the torque of the at least one electric drive motor is decreasing and the rotational speed of the at least one electric drive motor is increasing.

* * * * *

UNITED STATES PATENT AND TRADEMARK OFFICE
CERTIFICATE OF CORRECTION

| | | |
|---|---|---|
| PATENT NO. | : 11,679,753 B1 | Page 1 of 1 |
| APPLICATION NO. | : 17/327167 | |
| DATED | : June 20, 2023 | |
| INVENTOR(S) | : Nathan W. Bonny | |

It is certified that error appears in the above-identified patent and that said Letters Patent is hereby corrected as shown below:

In the Specification

Column 1, Line 51, "hybrid" should be changed to --hybrid vehicle of Fig. 1 to a set point.--.

Signed and Sealed this
Fifth Day of December, 2023

Katherine Kelly Vidal
*Director of the United States Patent and Trademark Office*